US007321950B2

(12) United States Patent
Bellows et al.

(10) Patent No.: US 7,321,950 B2
(45) Date of Patent: Jan. 22, 2008

(54) METHOD AND APPARATUS FOR MANAGING WRITE-TO-READ TURNAROUNDS IN AN EARLY READ AFTER WRITE MEMORY SYSTEM

(75) Inventors: Mark David Bellows, Rochester, MN (US); Paul Allen Ganfield, Rochester, MN (US); Kent Harold Haselhorst, Byron, MN (US); Ryan Abel Heckendorf, Rochester, MN (US); Tolga Ozguner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 11/050,021

(22) Filed: Feb. 3, 2005

(65) Prior Publication Data

US 2006/0174082 A1 Aug. 3, 2006

(51) Int. Cl.
*G06F 12/00* (2006.01)
(52) U.S. Cl. .............................. 711/5; 711/154; 711/168
(58) Field of Classification Search ...................... None
See application file for complete search history.

(56) References Cited

U.S. PATENT DOCUMENTS 6,351,427 B1 * 2/2002 Brown .................. 365/230.03
2006/0106975 A1 * 5/2006 Bellows et al. ............. 711/105

* cited by examiner

*Primary Examiner*—Reginald Bragdon
*Assistant Examiner*—Eric Cardwell
(74) *Attorney, Agent, or Firm*—Van Leeuwen & Van Leeuwen; D'Ann N. Rifai

(57) ABSTRACT

A method and apparatus for managing write-to-read turnarounds in an early read after write memory system are presented. Memory controller logic identifies a write operation's bank set, allows a different bank set read operation to issue prior to the write operation's completion, and allows a same bank set read operation to issue once the write operation completes. The memory controller includes operation counter logic, operation selection logic, operation acceptance logic, command formatting logic, and memory interface logic. The operation counter logic receives new-operation-related signals from the operation acceptance logic and, in turn, provides signals to the operation selection logic and the operation acceptance logic as to when to issue a read operation that corresponds to either an even DRAM bank or an odd DRAM bank.

14 Claims, 9 Drawing Sheets

| OPERATION SELECTION TABLE |||
|---|---|---|
| Even Read Preferred | Odd Read Preferred | Action |
| 0 | 0 | Select Either Even or Odd Read |
| 0 | 1 | Select Odd Read if Available |
| 1 | 0 | Select Even Read if Available |

# METHOD AND APPARATUS FOR MANAGING WRITE-TO-READ TURNAROUNDS IN AN EARLY READ AFTER WRITE MEMORY SYSTEM

BACKGROUND OF THE INVENTION

1. Technical Field

The present invention relates in general to a method and apparatus for managing write-to-read turnarounds in an early read after write (ERAW) memory system. More particularly, the present invention relates to a method and apparatus for issuing a write operation to a DRAM bank set and subsequently issuing an early read operation to a different DRAM bank set based upon a different bank set write-to-read timing parameter.

2. Description of the Related Art

Computer system developers constantly strive to increase a computer system's performance. The developers may focus on optimizing software components and/or hardware components in order to achieve this goal. One hardware optimization approach is to improve a processor's rate of reading from memory and writing to memory.

Hardware developers have designed a dynamic random access memory (DRAM) interface that includes a high-speed chip-to-chip data transfer technology. The interface technology may be implemented on standard CMOS DRAM cores and CMOS controller chips for applications such as high-performance main memory, PC graphics, game consoles, advanced digital consumer systems, high-performance networking systems, and other demanding applications requiring high-bandwidth memory subsystems.

DRAMs may include an "even" bank set and an "odd" bank set, whereby memory read operations and memory write operations correspond to a particular bank set. An early read after write feature of particular DRAMs, such as extreme data rate (XDR™) DRAMs, allows a read operation targeted to one bank set to commence before the completion of a write operation that was issued to a different bank set. For example, if an even bank write operation executes, an odd bank read operation may start before the even bank write operation completes. The time between the start of the write operation and the start of a different bank set read operation may be referred to as the "different bank set write-to-read turnaround time." Likewise, the time between the start of a write operation and the start of a same bank set read operation may be referred to as the "same bank set write-to-read turnaround time."

A challenge found with existing art, however, is since the different bank set write-to-read turnaround time is not the same time as the same bank set write-to-read turnaround time, it is difficult to manage these two timing parameters in order to achieve optimal memory system performance. Another challenge found is having the operation arbitration in the memory controller select the best type of read operation whenever possible, such as one that corresponds to a different bank set. If a memory system waits to send a different bank set read operation based upon the same bank set write-to-read turnaround time, system performance is degraded. And, if a memory system sends a same bank set read operation based upon the different bank set write-to-read turnaround time, bus conflicts arise.

What is needed, therefore, is a method and apparatus to manage same bank set write-to-read turnaround times and different bank set write-to-read turnaround times in order to optimize memory system performance in an early read after write memory system.

SUMMARY

It has been discovered that the aforementioned challenges are resolved using a method and apparatus that identify a write operation's bank set, allow a different bank set read operation to issue prior to the write operation's completion, and allow a same bank set read operation to issue once the write operation completes. A memory controller includes operation counter logic, operation selection logic, operation acceptance logic, command formatting logic, and memory interface logic. The operation counter logic receives new-operation-related signals from the operation acceptance logic and, in turn, provides signals to the operation selection logic and the operation acceptance logic as to when to issue a read operation that corresponds to either an even DRAM bank or an odd DRAM bank.

Communication between the memory controller and the DRAMs is governed by many timing parameters, two of which are $t_{WR}$ and $t_{WR-D}$. The first timing parameter, $t_{WR}$, is the primary influencing parameter with regard to when same bank set read operations are issued after write operations. The second timing parameter, $t_{WR-D}$, is the primary influencing parameter with regard to when different bank set read operations are issued after write operations.

When the operation acceptance logic issues a new operation, the operation acceptance logic asserts a "new operation signal" high, informing the operation counter logic of the newly issued operation. If the new operation corresponds to an even DRAM bank, the operation acceptance logic also asserts an "even bank signal" high. Likewise, if the new operation corresponds to an odd DRAM bank, the operation acceptance logic sets the "even bank signal" low. Furthermore, if the new operation is a write operation, the operation acceptance logic asserts a "write signal" high.

The operation counter logic uses the new operation signal, the even bank signal, and the write signal to load one of two in-use counters, one of two unavailable counters, and a preferred counter. When a write operation occurs, the in-use (even or odd) counter is loaded with a value that corresponds to the number of command cycles that the DRAM requires before reading from a same bank (i.e. $t_{WR}$). When a write operation occurs, the unavailable (even or odd) counter is loaded with a value that corresponds to the number of command cycles that the DRAM requires before reading from an opposite bank (i.e. $t_{WR-D}$). And, when a write operation occurs, the preferred counter is loaded with a value that corresponds to the number of command cycles that are required before the write operation is completed minus selection and pipelining considerations.

The output of the preferred counter informs the operation selection logic when to "prefer" an even bank read operation over an odd bank read operation, and visa-versa. For example, if the operation acceptance logic issues an even bank write operation, the operation counter logic uses the preferred counter to assert the odd read preferred signal high until the preferred counter decrements to zero. In turn, the operation selection logic offers an odd bank read operation to the operation acceptance logic if one exists in its read queue. If a preferred bank operation does not exist in its read queue, the operation selection logic offers a non-preferred bank operation to the operation acceptance logic. These preferred signals indicate which bank set a read operation should target for optimal performance.

The outputs of the in-use counter and the unavailable counter instruct the operation acceptance logic when to accept and pass an even bank read operation or an odd bank read operation to the command formatting logic. Using the example described above, when the operation acceptance logic issues the even bank write operation, the operation counter logic loads the in-use "even" counter and the unavailable "odd" counter. The unavailable odd counter starts counting and decrements to zero, whereby the operation counter logic asserts the "odd read allowable signal" high. When the in-use even counter decrements to zero, the operation counter logic asserts the "even read allowable signal" high. In one embodiment, when the DRAMs have a particular restriction on $t_{WR-D}$, after the unavailable odd counter reaches zero, the counter decrements into negative territory and asserts the odd read allowable signal high on every other command cycle until $t_{WR}$ is met, after which it remains asserted high.

The operation acceptance logic takes the operation offered by the operation selection logic based upon the even read allowable signal and the odd read allowable signal, and automatically passes the operation to the command formatting logic. In turn, the command formatting logic formats particular DRAM commands that correspond to the operation, such as an activate command, one or more column commands, and a precharge command. The command formatting logic issues the commands to a memory interface that, in turn, communicates the commands to the memory.

In one embodiment, the operation counter logic, the operation selection logic, and/or the operation acceptance logic may be implemented in a subroutine, such as in software or firmware. In another embodiment, the DRAMs may be comprised of extreme Data Rate (XDR™) DRAMs. In this embodiment, the memory interface that communicates with the DRAMs may be an XDR™ IO Cell (XIO™).

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
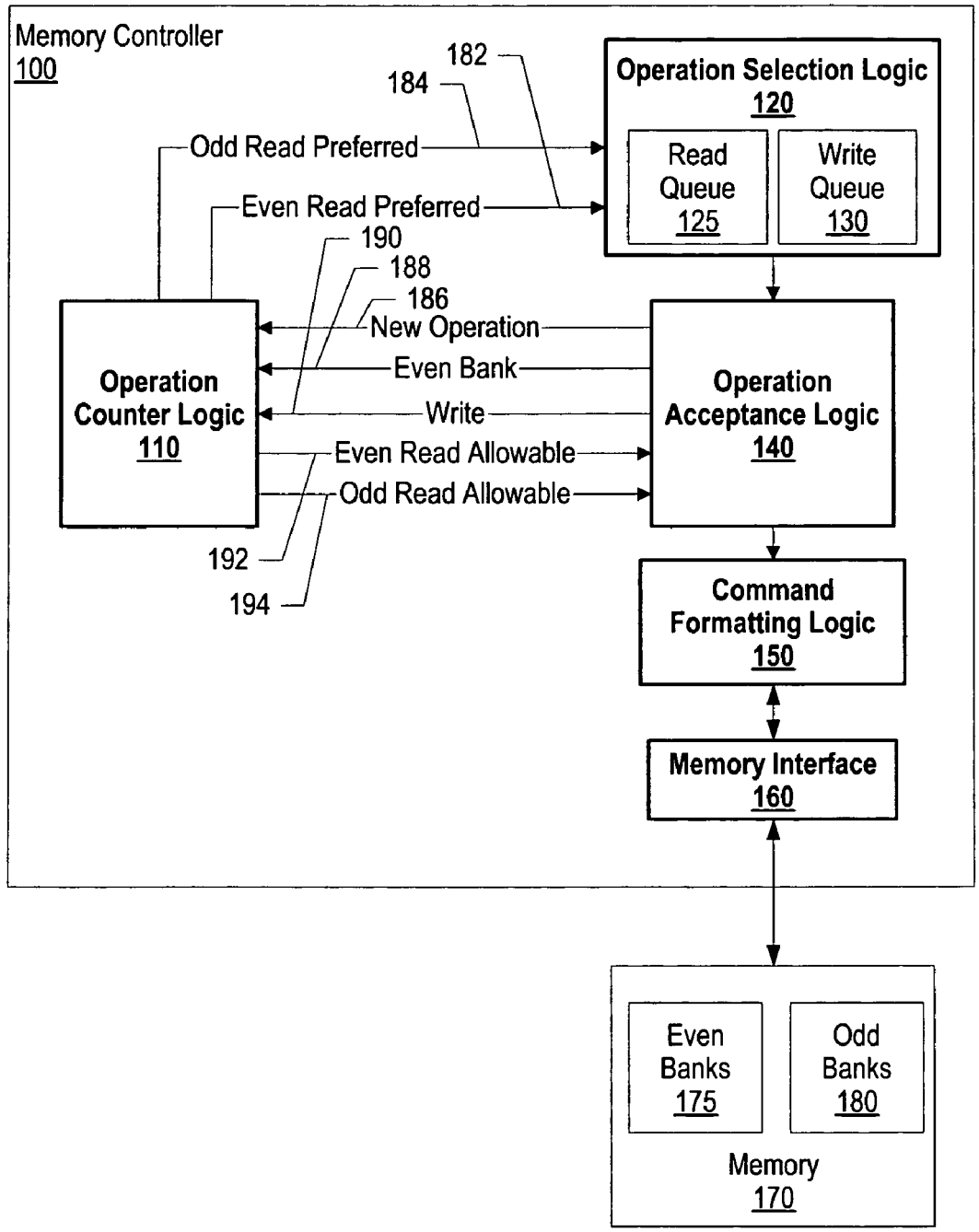
FIG. 1 is a diagram showing a memory controller that manages write-to-read turnarounds.

FIG. 1 is a diagram showing a memory controller that manages write-to-read turnarounds. Memory controller 100 includes operation counter logic 110, operation selection logic 120, operation acceptance logic 140, command formatting logic 150, and memory interface 160. Operation counter logic 110 receives new-operation-related signals from operation acceptance logic 140 and, in turn, provides signals to operation selection logic 120 and operation acceptance logic 140 as to when to issue a read operation that corresponds to either an even DRAM bank or an odd DRAM bank.

Communication between memory controller 100 and memory 170 is governed by many timing parameters, two of which are $t_{WR}$ and $t_{WR-D}$. The first timing parameter, $t_{WR}$, is the primary influencing parameter with regard to when same bank set read operations are issued after a write operation. The second timing parameter, $t_{WR-D}$, is the primary influencing parameter with regard to when different bank set read operations are issued after a write operation. In one embodiment, memory 170 may be an extreme data rate (XDR™) DRAM.

When operation acceptance logic 140 issues a new operation, operation acceptance logic 140 asserts new operation signal 186 high, informing operation counter logic 110 of the newly issued operation. If the new operation corresponds to an even DRAM bank, such as even banks 175 that are included in memory 170, operation acceptance logic 140 asserts even bank signal 188 high. Likewise, if the new operation corresponds to an odd DRAM bank, such as odd banks 180 included in memory 170, operation acceptance logic sets even bank signal 188 low. Furthermore, if the new operation is a write operation, operation acceptance logic 140 asserts write signal 190 high.

Operation counter logic 110 uses new operation signal 186, even bank signal 188, and write signal 190 to load one of two in-use counters, one of two unavailable counters, and a preferred counter. When a write operation occurs, the in-use (even or odd) counter is loaded with a value that corresponds to the number of command cycles that the DRAM requires before reading from a same bank (i.e. $t_{WR}$). When a write operation occurs, the unavailable (even or odd) counter is loaded with a value that corresponds to the number of command cycles that the DRAM requires before reading from an opposite bank (i.e. $t_{WR-D}$). And, when a write operation occurs, the preferred counter is loaded with a value that corresponds to the number of command cycles that are required before the write operation completes minus selection and pipelining considerations (see FIGS. 2, 3, and corresponding text for further details regarding counter properties).

The output of the preferred counter informs operation selection logic 120 when to "prefer" an even bank read operation over an odd bank read operation, and visa-versa. For example, if operation acceptance logic 140 issues an even bank write operation, operation counter logic 110 uses the preferred counter to assert odd read preferred signal 184 high until the preferred counter decrements to zero. Thus, operation selection logic 120 offers an odd bank read operation to operation acceptance logic 140 if one exists in read queue 125. If a preferred bank operation does not exist in read queue 125, operation selection logic 120 offers a non-preferred read operation if one exists.

The outputs of the in-use counter and the unavailable counter instruct operation acceptance logic 140 when to accept and pass an even bank read operation or an odd bank read operation to command formatting logic 150. Using the example described above, when operation acceptance logic 140 issues the even bank write operation, operation counter logic 110 loads the in-use "even" counter and the unavailable "odd" counter. The unavailable odd counter starts counting and decrements to zero, whereby operation counter logic 110 asserts odd read allowable signal 194 high. When the in-use even counter decrements to zero, operation counter logic 110 asserts even read allowable signal 192 high.

In one embodiment, when the DRAMs have a particular restriction on $t_{WR-D}$, after the unavailable odd counter reaches zero, the counter decrements into negative territory and asserts odd read allowable signal 194 high on every other command cycle until $t_{WR}$ is met, after which it remains asserted high.

When operation acceptance logic 140 takes the operation offered by operation selection logic 120 based upon even read allowable signal 192 and odd read allowable signal 194, operation acceptance logic 140 automatically passes the operation to command formatting logic 150. In turn, command formatting logic 150 formats particular DRAM commands that correspond to the operation, such as an activate command, one or more column commands, and a precharge command. Command formatting logic 150 issues the commands to memory interface 160 that, in turn, communicates the commands to memory 170.

In one embodiment, operation counter logic 110, operation selection logic 120, and/or operation acceptance logic 140 may be implemented in a subroutine, such as in software or firmware. In another embodiment, memory 170 may be comprised of extreme Data Rate (XDR™) DRAMs. In this embodiment, memory interface 160 may be an XDR™ IO Cell (XIO™) that communicates with memory 170.

Figures 2A, 2B:
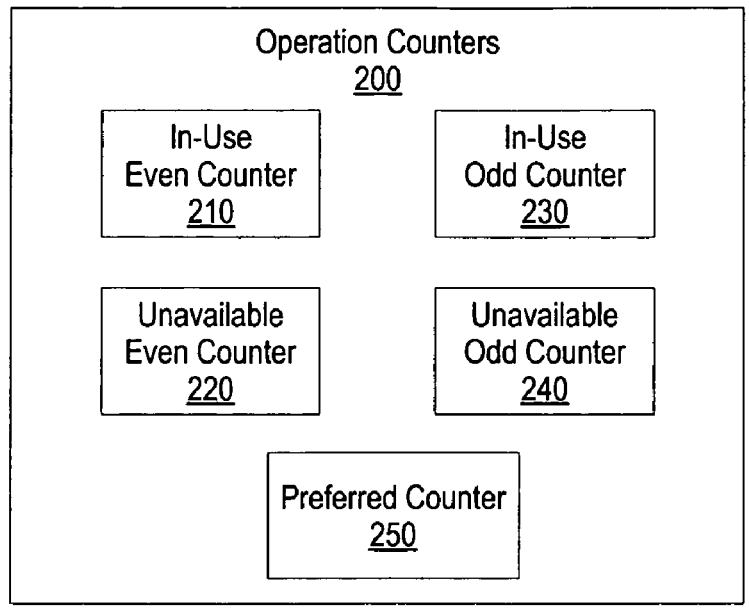
FIG. 2A is a diagram showing various operation counters.
FIG. 2B is a table showing signal states and corresponding operation selection logic's actions.

FIG. 2A is a diagram showing various operation counters. Operation counters 200 includes five counters. Two of the counters, in-use even 210 and unavailable odd 240, are loaded and start decrementing on each command cycle when an even bank write operation is taken by operation acceptance logic 140, which is shown in FIG. 1. When the write operation occurs, in-use even 210 is loaded with a value that corresponds to the number of command cycles that the DRAM requires before reading from a same bank set. In addition, unavailable odd 240 is loaded with a value that corresponds to the number of command cycles that the DRAM requires before reading from an opposite bank set. Two of the other counters, in-use odd 230 and unavailable even 220, are loaded and start decrementing on each command cycle when an odd bank write operation issues.

Preferred counter 250 is loaded and starts counting when either an even bank write operation or an odd bank write operation is taken/issued. Preferred counter 250 includes a value that corresponds to the number of command cycles that are required before a write operation completes minus selection and pipelining considerations.

FIG. 2B is a table showing signal states and corresponding operation selection logic's actions. The operation selection logic, such as operation selection logic 120 that is shown in FIG. 1, uses an even read preferred signal and an odd read preferred signal in determining whether to send an even bank read operation or an odd bank read operation to operation acceptance logic, such as operation acceptance logic 140 that is shown in FIG. 1.

Table 260 includes even read preferred signal states in column 280, and odd read preferred signal states in column 285. Column 290 includes an action that the operation selection logic performs based upon the even read preferred signal state and the odd read preferred signal state. Row 265 shows that when both the even read preferred signal and the odd read preferred signal are low, the operation selection logic may send either an even read operation or an odd read operation to the operation acceptance logic. Row 270 shows that when the even read preferred signal is low and the odd read preferred signal is high, the operation selection logic should send an odd bank read operation to the operation acceptance logic if one exists in its read queue. Finally, row 275 shows that when the even read preferred signal is high and the odd read preferred signal is low, the operation selection logic should send an even bank read operation to the operation acceptance logic if one exists in its read queue. If a read operation of the preferred type does not exist, the operation selection logic offers a read operation of the non-preferred type.

Figure 3:
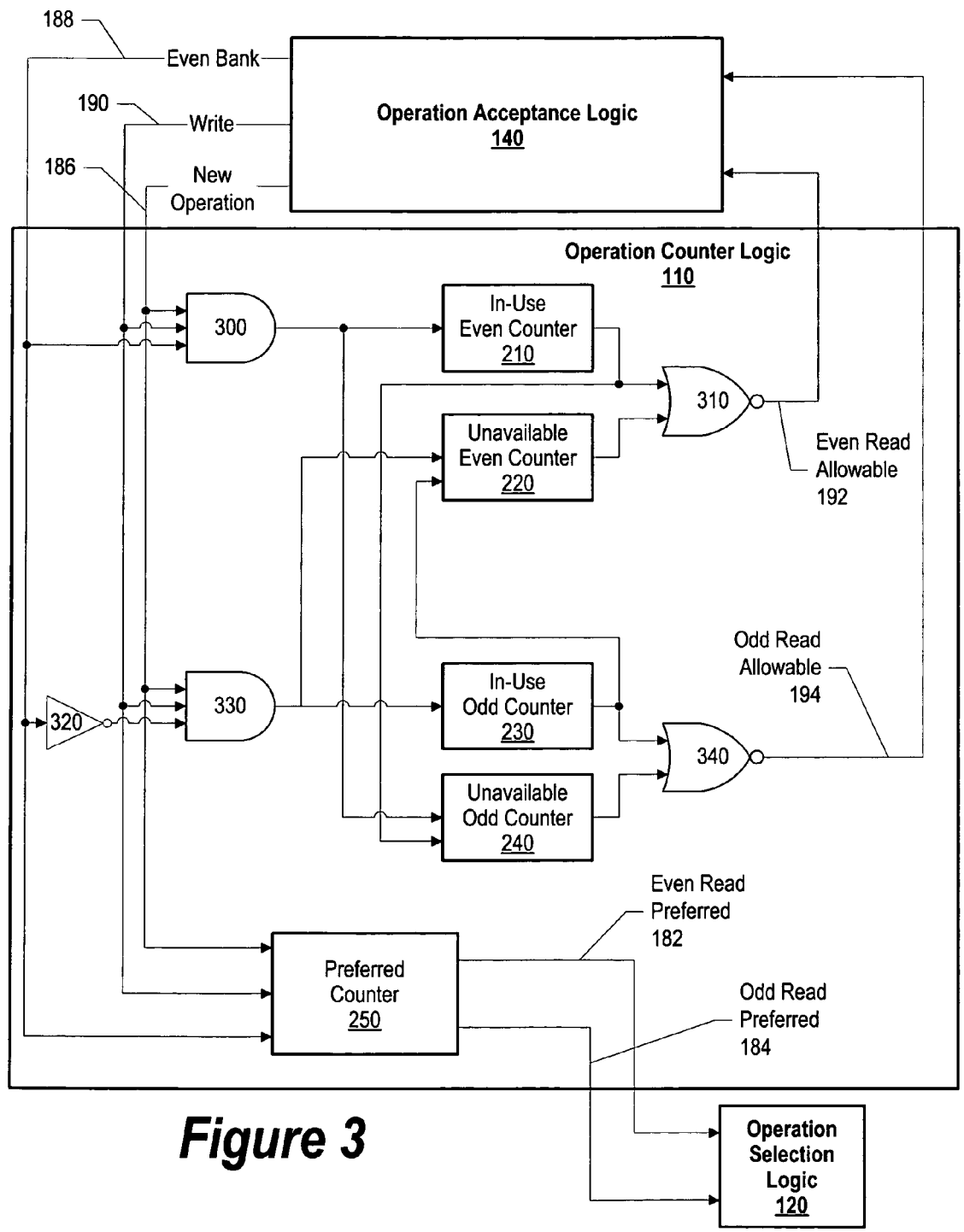
FIG. 3 is a diagram showing operation counter logic that determines when to instruct operation acceptance logic to allow an even bank read operation or an odd bank read operation after a write operation.

FIG. 3 is a diagram showing operation counter logic that determines when to instruct operation acceptance logic to allow an even bank read operation or an odd bank read operation after a write operation. Operation acceptance logic 140 provides new operation signal 186, write signal 190, and even bank signal 188 to operation counter logic 110. Operation acceptance logic 140, new operation signal 186, write signal 190, even bank signal 188, and operational counter logic 110 are the same as that shown in FIG. 1.

Operation acceptance logic 140 asserts new operation signal 186 high when it issues a new operation. In addition, write signal 190 is asserted high when the new operation is a write operation. Finally, even bank signal 188 is asserted high when the new operation corresponds to an even DRAM bank.

Preferred counter 250 receives operation acceptance logic 140's signals, and asserts even read preferred signal 184 or odd read preferred signal 182 based upon the received signals' states. When preferred counter 250 receives signals that correspond to an even bank write operation, preferred counter 250 asserts odd read preferred signal 184 and loads the counter with the value described earlier, which instructs operation selection logic 120 to issue an odd bank read operation if one exists in its read queue and if it wishes to switch to reads. When the counter decrements to zero, preferred counter 250 resets odd read preferred signal 184 (see FIG. 2B and corresponding text for further details regarding read operation selection). Likewise, when preferred selection counter 250 receives signals that correspond to an odd bank write operation, preferred selection counter 250 loads its counter and asserts even read preferred 182, which directs operation selection logic 120 to issue an even bank read command if one exists in its read queue and if it wishes to switch to reads. When the counter decrements to zero, preferred selection counter 250 resets even read preferred signal 182. During the course of operation, if the even preferred signal is asserted, the odd preferred signal is negated if it was asserted, and vice-versa.

In addition, gates 300 and 330 also receive operation acceptance logic 140's outputs. When the new operation is a write operation and corresponds to an even DRAM bank, gate 300's output is high which, in turn, loads in-use even counter 210 and unavailable odd counter 240. As such, both counter outputs are set to high which, therefore, brings gate 310's output low (even read allowable signal 192) and gate 340's output low (odd read allowable signal 194).

Even read allowable 192 stays low until in-use counter 210 decrements to zero, which causes in-use counter 210's output to reset. This time corresponds to the same bank set write-to-read turnaround time. Odd read allowable 194 stays low until unavailable odd counter 240 decrements to zero, which corresponds to the different bank set write-to-read turnaround time (see FIG. 7 and corresponding text for further details regarding unavailable counter output states). Therefore, when an even bank write operation occurs, even read allowable signal 192 stays low until the write operation is complete, but the odd read allowable signal 194 stays low for a brief period, and then is asserted high, thereby allowing operation acceptance logic 140 to issue an odd bank read operation before the even bank write operation completes. When in-use even counter 210's output resets, unavailable odd counter 240's output becomes low. Effectively, this stops the "restriction on $t_{WR\text{-}D}$" feature.

A similar situation exists for odd bank write operations. Since even bank signal 188 passes through inverter 320, when a new operation is a write operation and corresponds to an odd memory bank, gate 330's output is high which, in turn, loads in-use odd counter 230 and unavailable even counter 220. As such, both counter outputs are set to high which, therefore, brings gate 340's output low (odd read allowable signal 194) until the write operation completes and brings gate 310's output low (even read allowable signal 192) for the brief period required before reading from the opposite bank set. When in-use odd counter 230's output resets, unavailable even counter 220's output becomes low. Effectively, this stops the "restriction on $t_{WR\text{-}D}$" feature.

Figure 4:
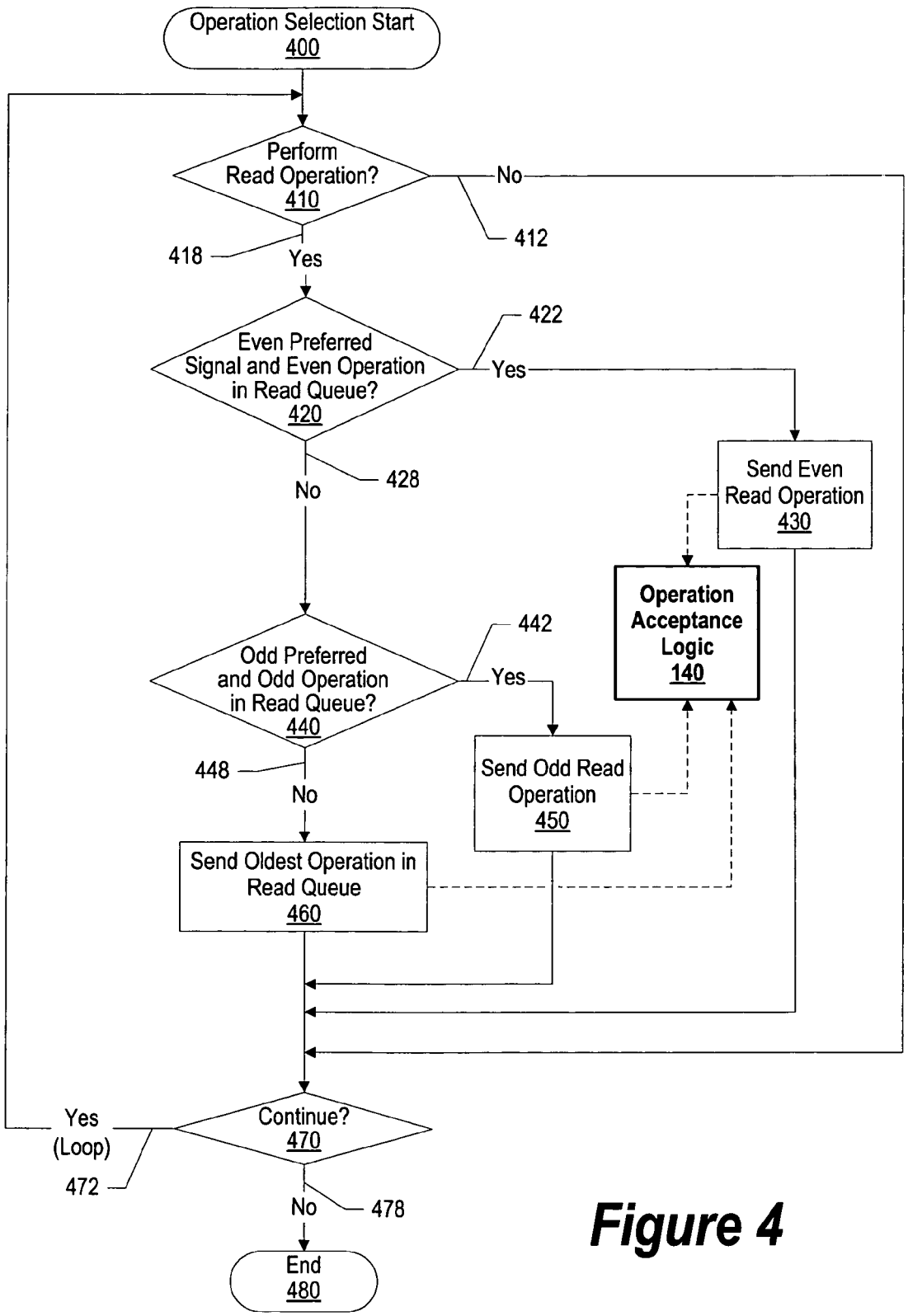
FIG. 4 is a flowchart showing steps taken in determining which type of read operation to offer to operation acceptance logic.

FIG. 4 is a flowchart showing steps taken in determining which type of read operation to offer to operation acceptance logic. The operation selection logic receives an even preferred signal and an odd preferred signal from operation counter logic, such as operation counter logic 110 shown in FIG. 1, and provides even bank read operations or odd bank read operations to operation acceptance logic 140 based upon the received signals and the read operations that exists in the operation selection logic's read queue. As one skilled in the art can appreciate, other approaches may be used to perform operation selection tasks, such as a software subroutine or firmware. Operation acceptance logic 140 is the same as that shown in FIG. 1.

Operation selection processing commences at 400, whereupon a determination is made as to whether to perform a read operation (decision 410). If processing does not choose to perform a read operation, decision 410 branches to "No" branch 412 whereupon a determination is made as to whether to continue (decision 470). On the other hand, if processing chooses to perform a read operation, decision 410 branches to "Yes" branch 418.

A determination is made as to whether the even preferred signal is asserted high and, if so, whether an even bank read operation is located in the read queue (decision 420). If the even preferred signal is asserted high and an even bank read operation is in the read queue, decision 420 branches to "Yes" branch 422 whereupon processing sends the even read operation to operation acceptance logic 140 at step 430.

On the other hand, if the even preferred signal is low and/or an even bank read operation is not in the read queue, decision 420 branches to "No" branch 428. A determination is made as to whether the odd preferred signal is asserted high and an odd bank read operation is in the read queue (decision 440). If the odd preferred signal is asserted high and an odd bank read operation is in the read queue, decision 440 branches to "Yes" branch 442 whereupon processing sends the odd bank read operation to operation acceptance logic 140 at step 450.

On the other hand, if the odd preferred signal is low and/or an odd bank read operation is not in the read queue, decision 440 branches to "No" branch 448 whereupon processing sends the read queue's oldest available read operation to operation acceptance logic 140 (step 460).

A determination is made as to whether to continue processing read operations (decision 470). If processing should continue, decision 470 branches to "Yes" branch 472 which loops back to process more operations. This looping continues until processing should stop processing operations, at which point decision 470 branches to "No" branch 478 whereupon processing ends at 480.

Figure 5:
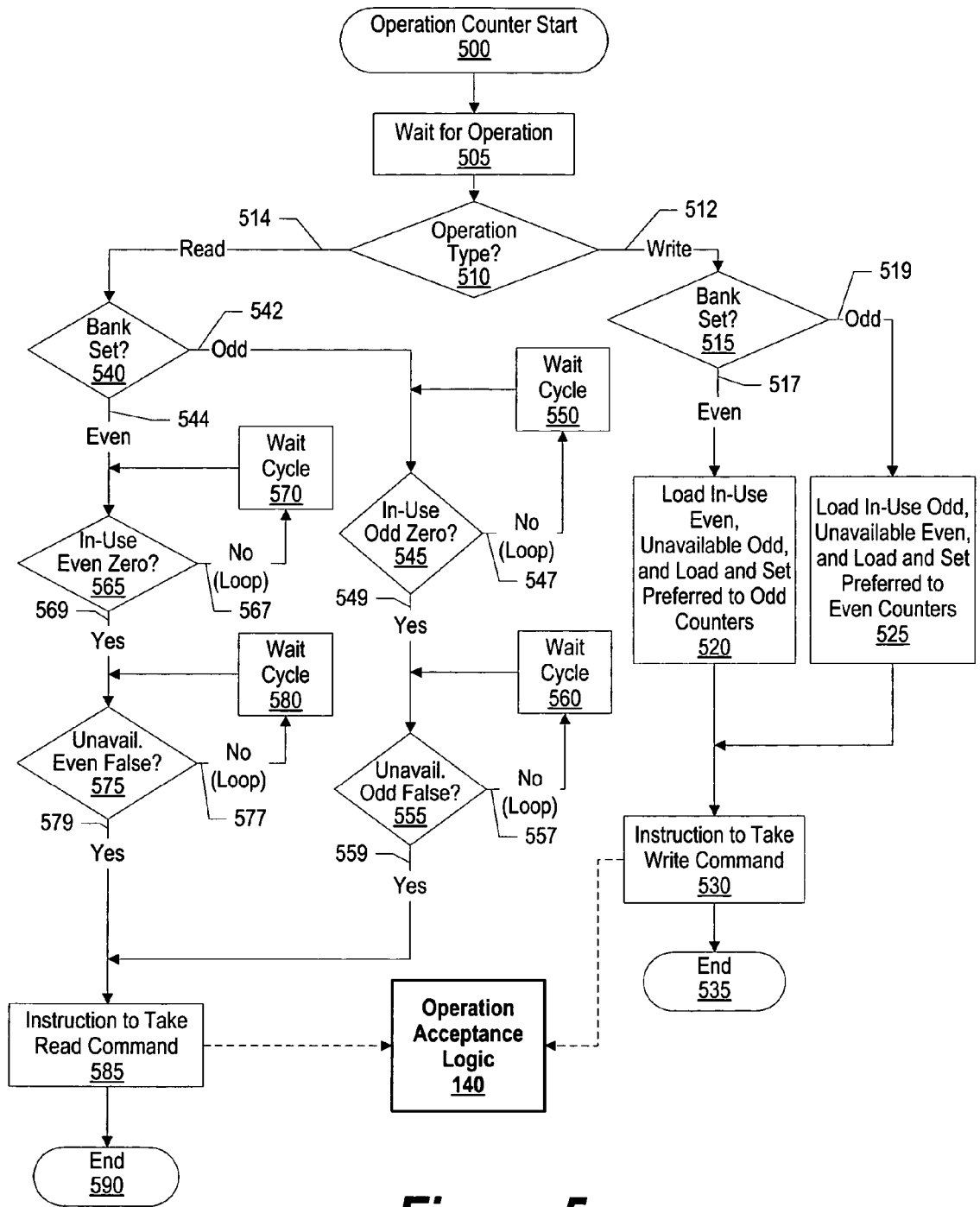
FIG. 5 is a flowchart showing steps taken in determining when to direct operation acceptance logic to send a read operation or a write operation.

FIG. 5 is a flowchart showing steps taken in determining when to instruct operation acceptance logic to send a read operation or a write operation. As those skilled in the art can appreciate, the flowchart steps shown in FIG. 5 may be implemented in hardware, such as operation counter logic 110 shown in FIG. 1, or they may be implemented in a software subroutine or firmware.

Operation counter processing commences at 500, whereupon processing waits for a new operation at step 505. Once processing receives a new operation, a determination is made as to whether the operation is a read operation or a write operation (decision 510). If the operation is a write operation, decision 510 branches to "Write" branch 512 whereupon a determination is made as to whether the write operation is to an even DRAM bank or an odd DRAM bank (decision 515).

If the write operation is to an even DRAM bank, decision 515 branches to "Even" branch 517 whereupon processing loads an in-use even counter, an unavailable odd counter, and a preferred counter, which is set to odd (step 520). Each of the counters include values that correspond to how many command cycles it takes to perform a particular function (see FIGS. 2A, 3, and corresponding text for further details for each counter). On the other hand, if the write operation is to an odd DRAM bank, decision 515 branches to "Odd" branch 519 whereupon processing loads an in-use odd counter, an unavailable even counter, and the preferred counter, which is set to even (step 525). Processing then instructs operation acceptance logic 140 to take the write command from operation selection logic 120 shown in FIG. 1 (step 530). Operation acceptance logic 140 is the same as that shown in FIG. 1. Processing ends at 535.

If processing receives a read operation, decision 510 branches to "Read" branch 514 whereupon a determination is made as to whether the read operation is to an even DRAM bank or an odd DRAM bank (decision 540). If the read operation is to an odd DRAM bank, decision 540 branches to "Odd" branch 542 whereupon a determination is made as to whether the in-use odd counter is zero (decision 545). If the in-use odd counter is not zero, this signifies that an odd bank write operation is executing, and the odd bank read operation is not allowed until the write operation completes (i.e. in-use odd counter equals zero). If the in-use odd counter is not zero, decision 545 branches to "No" branch 547 whereupon processing waits a command cycle, which decrements the in-use odd counter (step 550), and then checks the value of the in-use odd counter. This looping continues until the in-use odd counter has decremented to zero, at which point decision 545 branches to "Yes" branch 549.

A determination is made as to whether the unavailable odd counter indicates true or false (decision 555). The unavailable odd counter's status changes based upon the flowchart shown in FIG. 7. If the unavailable odd counter is true, decision 555 branches to "No" branch 557 whereupon processing waits a command cycle, which decrements the unavailable odd counter (step 560), and then checks the value of the unavailable odd counter. This looping continues until the unavailable odd counter indicates that an odd read may start (False), at which point decision 555 branches to "Yes" branch 559 whereupon processing instructs operation acceptance logic 140 to take the odd bank read operation from operation selection logic 120 shown in FIG. 1 (step 585).

If the read operation is to an even DRAM bank, decision 540 branches to "Even" branch 544 whereupon a determination is made as to whether an in-use even counter is zero (decision 565). If the in-use even counter is not zero, decision 565 branches to "No" branch 567 whereupon processing waits a command cycle, which decrements the in-use even counter (step 570), and then checks the value of the in-use even counter. This looping continues until the in-use even counter decrements to zero, at which point decision 565 branches to "Yes" branch 569.

A determination is made as to whether an unavailable even counter indicates true or false (decision 575). The unavailable even counter's status changes based upon the flowchart shown in FIG. 7. If the unavailable even counter is true, decision 575 branches to "No" branch 577 whereupon processing waits a command cycle, which decrements the unavailable even counter (step 580), and then checks the value of the unavailable even counter. This looping continues until the unavailable even counter indicates that an even to read may start (False), at which point decision 575 branches to "Yes" branch 579 whereupon processing instructs operation acceptance logic 140 to take the even bank read operation from operation selection logic 120 shown in FIG. 1 (step 585). Processing ends at 590. As one skilled in the art can appreciate, the flowchart shown in FIG. 5 may repeat until processing terminates.

Figure 6:
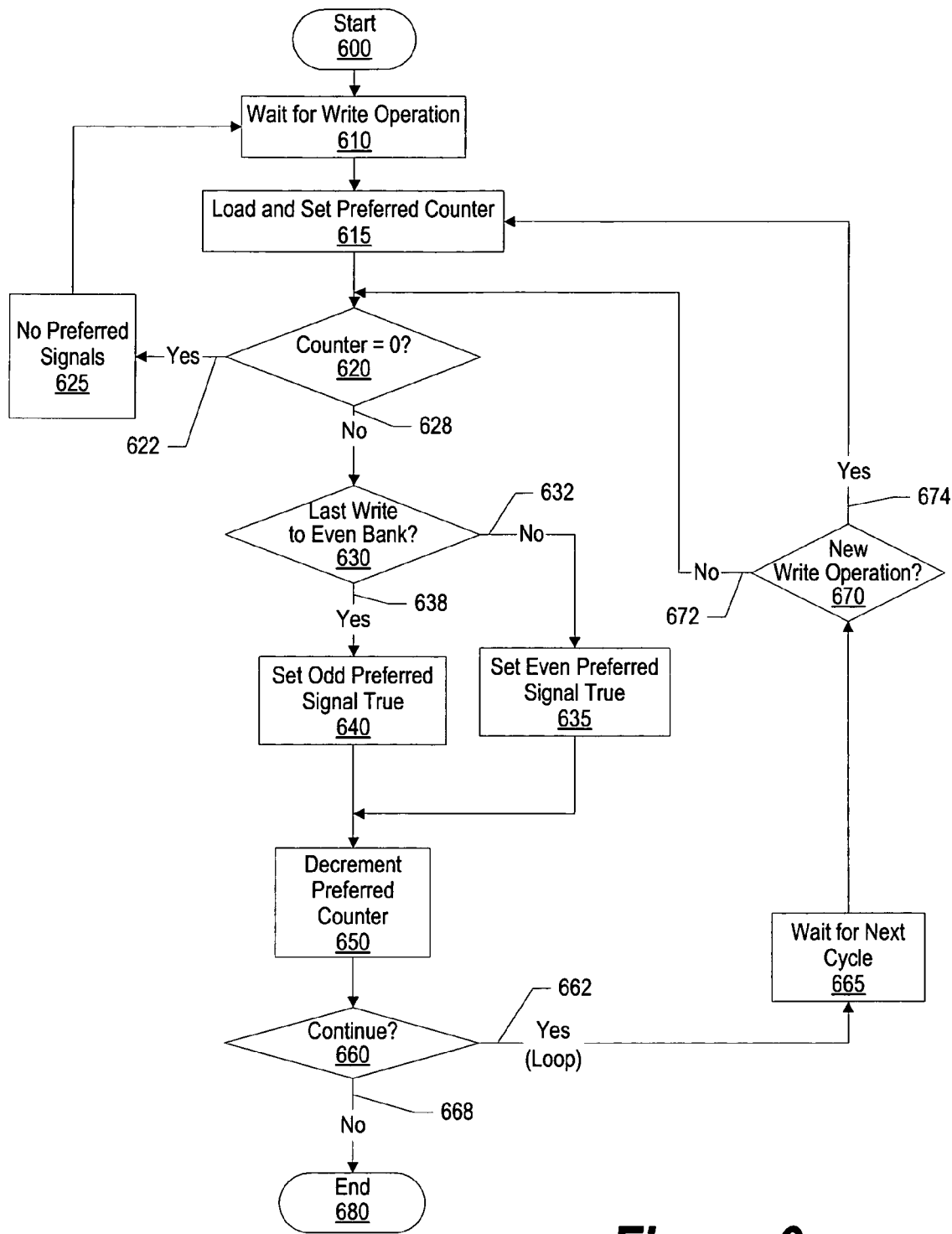
FIG. 6 is a flowchart showing steps taken in operation counter logic informing operation selection logic as to whether to offer an even bank read operation or an odd bank read operation.

FIG. 6 is a flowchart showing steps taken in operation counter logic informing operation selection logic as to whether to offer an even bank read operation or an odd bank read operation. The operation counter logic asserts an "even read preferred" signal when an odd bank write operation occurs, and asserts an "odd read preferred" signal when an even bank write operation occurs. As those skilled in the art can appreciate, the flowchart steps shown in FIG. 6 may be implemented in hardware, such as preferred counter 250 shown in FIG. 3, or they may be implemented in a software subroutine or firmware.

Processing commences at 600, whereupon processing waits for a write operation at step 610. At step 615, processing loads and sets the preferred counter. A determination is made as to whether the preferred counter equals zero (decision 620). If the preferred counter equals zero, decision 620 branches to "Yes" branch 622 whereupon processing does not assert either an even read preferred signal or an odd read preferred signal (step 625), and waits for another operation. On the other hand, if the preferred counter does not equal zero, decision 620 branches to "No" branch 628.

A determination is made as to whether the write operation was to an even DRAM bank (decision 630). If the write operation was to an even DRAM bank, decision 630 branches to "Yes" branch 638 whereupon processing asserts an odd read preferred signal and negates the even read preferred signal if it was asserted at step 640, thus signifying that an odd bank read operation is preferred to be sent instead of an even bank read operation. On the other hand, if the write operation was to an odd memory bank, decision 630 branches to "No" branch 632 whereupon processing asserts an even read preferred signal and negates the odd read preferred signal if it was asserted at step 635, thus signifying that an even bank read operation is preferred to be sent instead of an odd bank read operation.

At step 650, processing decrements the preferred counter. A determination is made as to whether to continue processing (decision 660). If processing should continue, decision 660 branches to "Yes" branch 662 which loops back to wait for the next command cycle at step 665. A determination is made as to whether processing receives a new write operation (decision 670). If processing receives a new write operation, decision 670 branches to "Yes" branch 674 whereupon processing loads the preferred counter in response to receiving the new write operation. On the other hand, if processing does not receive a new write operation, decision 670 branches to "No" branch 672 bypassing preferred counter loading steps. When processing should terminate, decision 660 branches to "No" branch 668 whereupon processing ends at 680.

Figure 7:
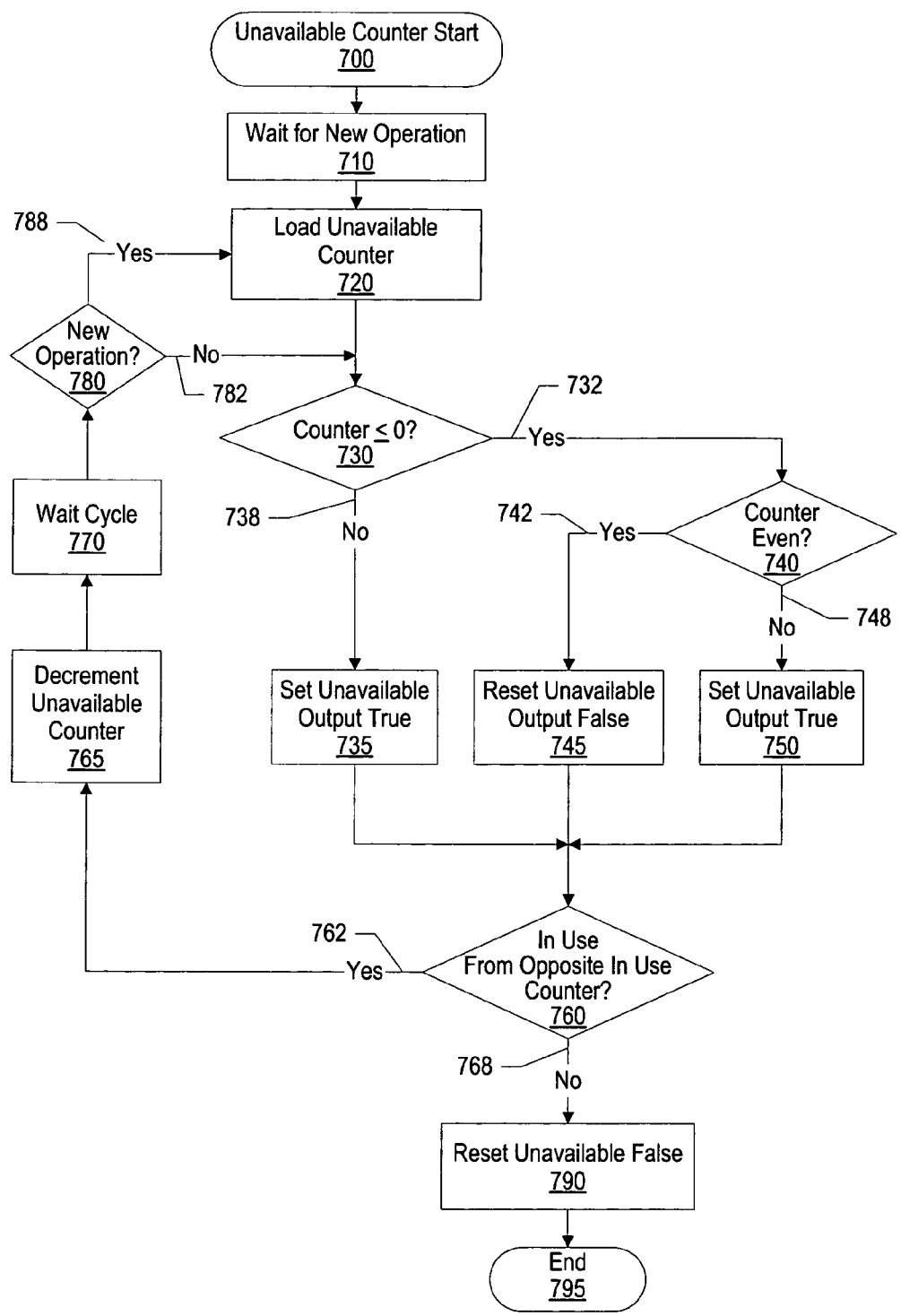
FIG. 7 is a flowchart showing steps taken in operation counter logic determining when to direct operation acceptance logic to allow a different bank set read operation after a write operation.

FIG. 7 is a flowchart showing steps taken in operation counter logic determining when to direct operation acceptance logic to allow a different bank set read operation after a write operation. The operation counter logic includes an unavailable even counter and an unavailable odd counter. When a write operation issues, the opposite unavailable counter is loaded with a value that corresponds to the number of command cycles that the DRAM requires before reading from the opposite bank. The flowchart shown in FIG. 7 is used for both the unavailable even counter as well as the unavailable odd counter. The following discusses the flowchart for use with an unavailable odd counter but, as those skilled in the art can appreciate, a similar approach may be used with the unavailable even counter. In addition, as those skilled in the art can appreciate, other approaches may be used to perform the steps shown in FIG. 7, such as a software subroutine or firmware.

Processing commences at 700, whereupon processing waits for a new even write operation (step 710). At step 720, processing loads the unavailable odd counter, and a determination is made as to whether the unavailable odd counter is less than or equal to zero (decision 730). If the unavailable odd counter is not less than or equal to zero, decision 730 branches to "No" branch 738 whereupon processing sets an unavailable odd signal to true, thus signifying that the DRAM bank set is unavailable for reads. On the other hand, if the unavailable odd counter is less than or equal to zero, decision 730 branches to "Yes" branch 732.

A determination is made as to whether the unavailable odd counter value is even (decision 740). For example, when the value is zero or negative and even, the timing matches a write to read turnaround time for a different bank set ($t_{WR-D}$). If the unavailable odd counter value is even, decision 740 branches to "Yes" branch 742 whereupon processing resets the unavailable odd signal to false (step 745). On the other hand, if the unavailable odd counter value is not even, decision 740 branches to "No" branch 748 whereupon processing sets the unavailable odd signal to true (step 750).

A determination is made as to whether an in-use signal from an in-use even counter is true, such as the output of in-use even counter 210 and in-use odd counter 230 that are shown in FIG. 3 (decision 760). If the in-use even counter's signal is true, decision 760 branches to "Yes" branch 762 whereupon processing decrements the unavailable odd counter at step 765, and waits a command cycle (step 770). A determination is made as to whether processing receives a new even-write operation (decision 780). If processing receives a new even-write operation, decision 780 branches to "Yes" branch 788 whereupon processing reloads the unavailable odd counter. On the other hand, if processing does not receive a new even-write operation, decision 780 branches to "No" branch 782 bypassing unavailable odd counter reloading steps.

If the in-use even counter's signal is false, decision 760 branches to "No" branch 768 whereupon processing resets the unavailable odd signal false (step 790), and processing ends at 795.

Figure 8:
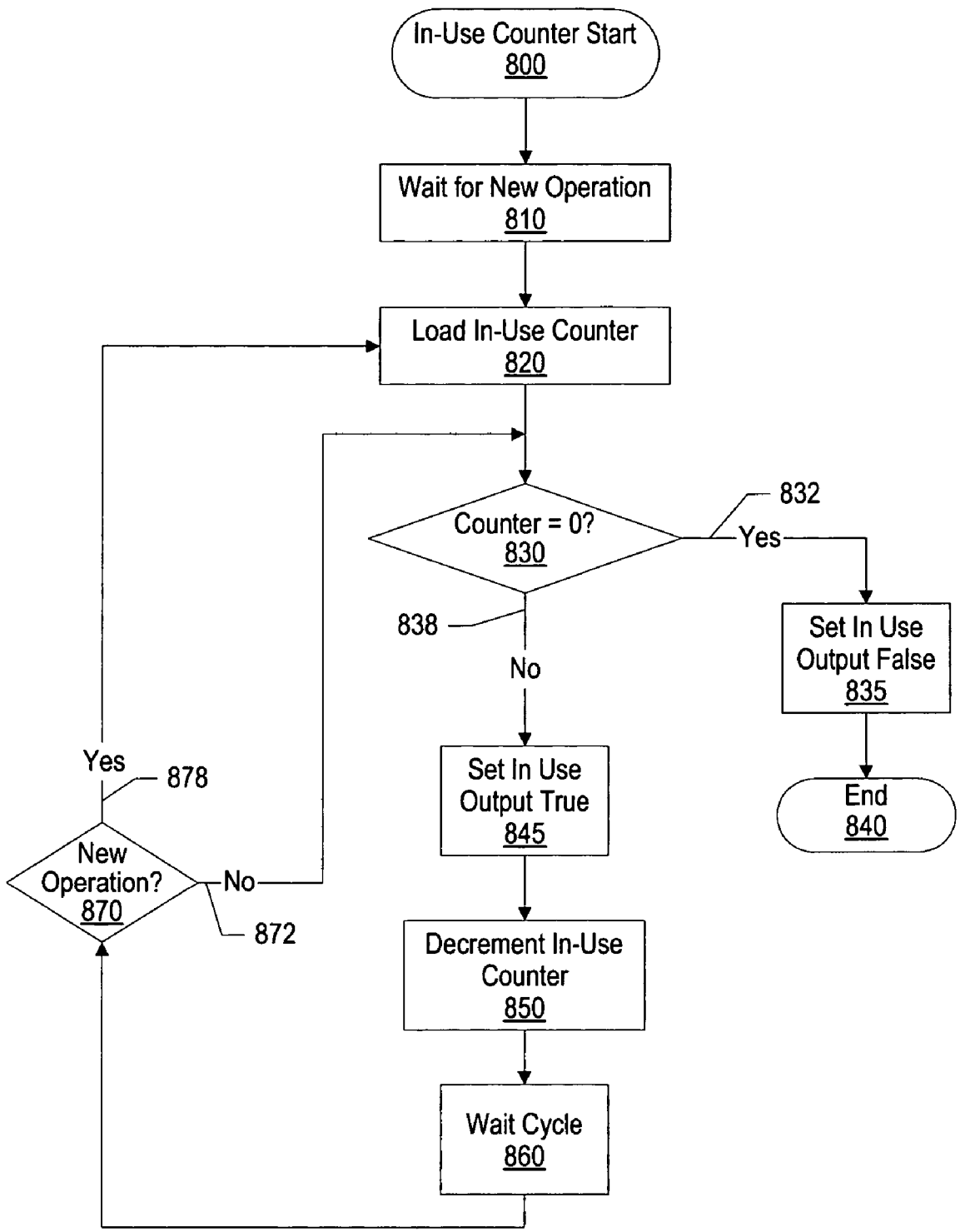
FIG. 8 is a flowchart showing steps taken in operation counter logic determining when to direct operation acceptance logic to allow a same bank set read operation after a write operation.

FIG. 8 is a flowchart showing steps taken in operation counter logic determining when to direct operation acceptance logic to allow a same bank set read operation after a write operation. The operation counter logic includes an in-use even counter and an in-use odd counter. When a write operation issues, the corresponding in-use counter loads with a value that corresponds to the number of command cycles that the DRAM requires before reading from the same bank set. The flowchart shown in FIG. 8 is used for both the in-use even counter as well as the in-use odd counter. The following discusses the flowchart for use with an in-use even counter but, as those skilled in the art can appreciate, a similar approach may be used with the in-use odd counter. In addition, as those skilled in the art can appreciate, other approaches may be used to perform the steps shown in FIG. 8, such as a software subroutine or firmware.

Processing commences at 800, whereupon processing waits for a new even write operation (step 810). Once processing receives a new even write operation, processing loads the in-use even counter at step 820. A determination is made as to whether the in-use even counter equals zero (decision 830). If the in-use even counter does not equal zero, decision 830 branches to "No" branch 838 which sets the in-use even counter's output to true (step 845). At step 850, processing decrements the in-use even counter, and waits for the next command cycle at step 860.

A determination is made as to whether processing receives a new even write operation (decision 870). If processing receives a new even write operation, decision 870 branches to "Yes" branch 878 whereupon processing reloads the in-use even counter. On the other hand, if processing did not receive a new operation, decision 870 branches to "No" branch 872 bypassing in-use even counter reloading steps.

When the in-use even counter equals zero, decision 830 branches to "Yes" branch 832 whereupon processing resets the in-use even counter's output to false, signifying that the even write operation is complete, and that an even bank read operation may issue (step 835). Processing ends at 840.

Figure 9:
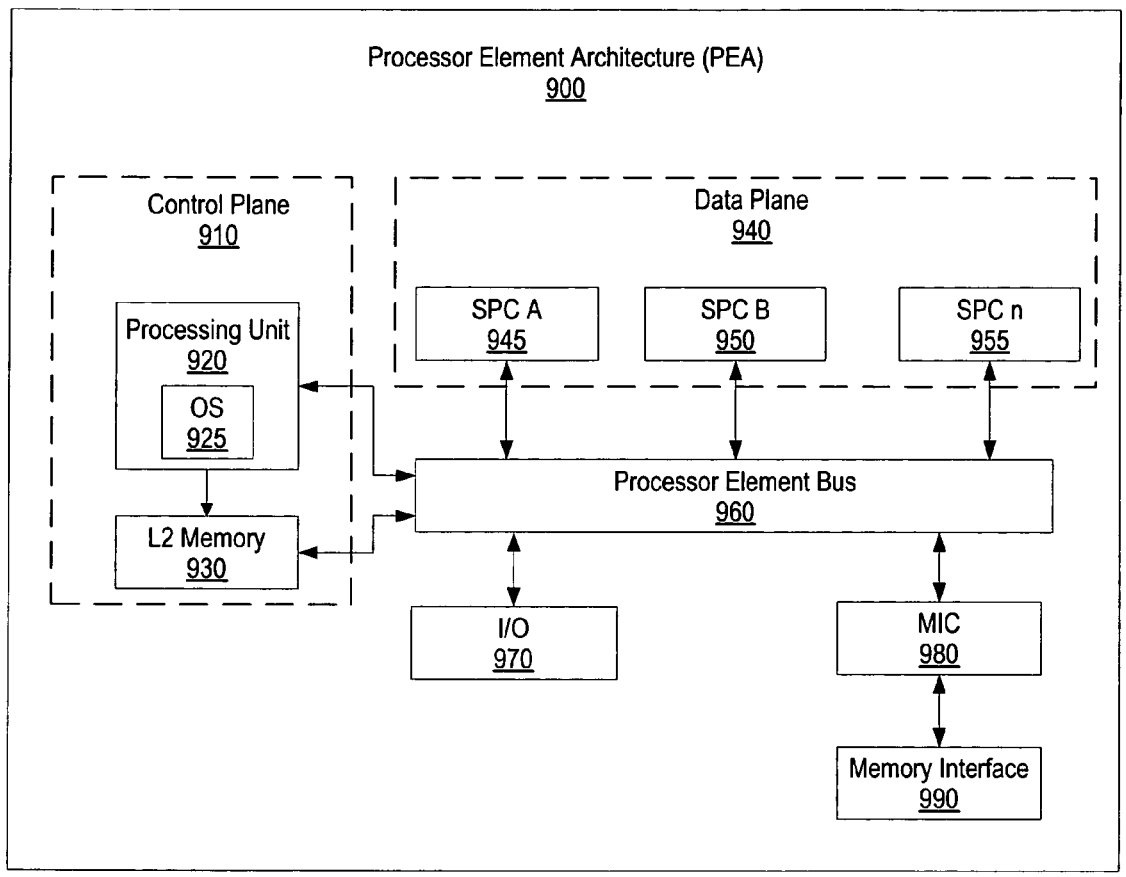
FIG. 9 is a block diagram of a computing device capable of implementing the present invention.

FIG. 9 is a block diagram of a computing device capable of implementing the present invention. The architecture shown in FIG. 9 includes heterogeneous processors that share a common memory and a common bus. Processor element architecture (PEA) 900 sends and receives information to/from external devices through input output 970, and distributes the information to control plane 910 and data plane 940 using processor element bus 960. Control plane 910 manages PEA 900 and distributes work to data plane 940.

In addition, processor element bus 960 provides read and write requests to memory interface controller (MIC) 980. Memory interface controller 980 communicates the requests to memory interface 990 that, in turn, communicates with external memory. In one embodiment, the memory may be extreme Data Rate (XDR™) DRAM, and, in this embodiment, memory interface 990 is an XIO™ that communicates with the XDR™ DRAM.

Control plane 910 includes processing unit 920, which runs operating system (OS) 925. For example, processing unit 920 may be a Power PC core that is embedded in PEA 900 and OS 925 may be a Linux operating system. Processing unit 920 manages a common memory map table for PEA 900. The memory map table corresponds to memory locations included in PEA 900, such as L2 memory 930 as well as non-private memory included in data plane 940.

Data plane 940 includes Synergistic Processing Complexs (SPC) 945, 950, and 955. Each SPC is used to process data information and each SPC may have different instruction sets. For example, PEA 900 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU), which is a processing core, such as a digital signal processor, a microcontroller, a microprocessor, or a combination of these cores.

SPC 945, 950, and 955 are connected to processor element bus 960, which passes information between control plane 910, data plane 940, and input/output 970. Bus 960 is an on-chip coherent multi-processor bus. Input/output 970 includes flexible input-output logic, which dynamically assigns interface pins to input-output controllers based upon peripheral devices that are connected to PEA 900. For example, PEA 900 may be connected to two peripheral devices, such as peripheral A and peripheral B, whereby each peripheral connects to a particular number of input and output pins on PEA 900. In this example, the flexible input-output logic is configured to route PEA 900's external input and output pins that are connected to peripheral A to a first input-output controller and route PEA 900's external input and output pins that are connected to peripheral B to a second input-output controller.

While the computer system described in FIG. 9 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A system comprising:
   a memory controller with logic effective to:
      provide a write operation that corresponds to a first memory bank set that is included in a memory;

identify a command cycle to allow a read operation that corresponds to a second memory bank set, the first memory bank set different than the second memory bank set;

issue the read operation based upon the identifying; and wherein the logic includes one or more in-use counters, the logic further effective to:

load an in-use counter value into one of the in-use counters;

adjust the in-use counter value;

determine whether the in-use counter value has reached a predetermined number in response to the adjusting;

allow a same bank set read operation based upon determining that the in-use counter value has reached the predetermined number; and reset an unavailable counter in response to determining that the in-use counter value has reached the predetermined number.

2. The system of claim 1 wherein the logic includes operation selection logic that is further effective to:

receive one or more read preferred signals;

determine whether the read operation exists in a read queue that corresponds to the read preferred signals; and offer the read operation based upon the determination.

3. The system of claim 1 wherein the logic includes one or more unavailable counters, the logic further effective to:

load an unavailable counter value into one of the unavailable counters;

adjust the unavailable counter value;

determine whether the unavailable counter value has reached zero in response to the adjusting; and allow the read operation based upon the determination.

4. The system of claim 3 wherein the logic is further effective to:

adjust the unavailable counter value into negative territory, resulting in a negative unavailable counter value;

determine whether the negative unavailable counter value is evenly divisible by two; and allow the read operation based upon determining that the negative unavailable counter value is evenly divisible by two.

5. The system of claim 1 wherein the memory controller is included in a processing element architecture.

6. A computer-implemented method comprising:

providing a write operation that corresponds to a first memory bank set that is included in a memory;

identifying a command cycle to allow a read operation that corresponds to a second memory bank set, the first memory bank set different than the second memory bank set;

issuing the read operation based upon the identifying;

loading an in-use counter value into an in-use counter;

adjusting the in-use counter value;

determining whether the in-use counter value has reached a predetermined number in response to the adjusting;

allowing a same bank set read operation based upon determining that the in-use counter value has reached the predetermined number; and resetting an unavailable counter in response to determining that the in-use counter value has reached the predetermined number.

7. The method of claim 6 further comprising:

receiving one or more read preferred signals;

determining whether the read operation exists in a read queue that corresponds to the read preferred signals; and offering the read operation based upon the determination.

8. The method of claim 6 further comprising:

loading an unavailable counter value into an unavailable counter;

adjusting the unavailable counter value;

determining whether the unavailable counter value has reached zero in response to the adjusting; and allowing the read operation based upon the determination.

9. The method of claim 8 further comprising:

adjusting the unavailable counter value into negative territory, resulting in a negative unavailable counter value;

determining whether the negative unavailable counter value is evenly divisible by two; and allowing the read operation based upon determining that the negative unavailable counter value is evenly divisible by two.

10. The method of claim 6 wherein the method is executed in a processing element architecture.

11. A program product comprising:

computer operable medium having computer readable code, the computer readable code being effective to:

provide a write operation that corresponds to a first memory bank set that is included in a memory;

identify a command cycle to allow a read operation that corresponds to a second memory bank set, the first memory bank set different than the second memory bank set;

issue the read operation based upon the identifying;

load an in-use counter value into an in-use counter;

adjust the in-use counter value;

determine whether the in-use counter value has reached a predetermined number in response to the adjusting;

allow a same bank set read operation based upon determining that the in-use counter value has reached the predetermined number; and reset an unavailable counter in response to determining that the in-use counter value has reached the predetermined number.

12. The program product of claim 11 wherein the computer readable code is further effective to:

receive one or more read preferred signals;

determine whether the read operation exists in a read queue that corresponds to the read preferred signals; and offer the read operation based upon the determination.

13. The program product of claim 11 wherein the computer readable code is further effective to:

load an unavailable counter value into an unavailable counter;

adjust the unavailable counter value;

determine whether the unavailable counter value has reached zero in response to the adjusting; and allow the read operation based upon the determination.

14. The program product of claim 13 wherein the computer readable code is further effective to:

adjust the unavailable counter value into negative territory, resulting in a negative unavailable counter value;

determine whether the negative unavailable counter value is evenly divisible by two; and allow the read operation based upon determining that the negative unavailable counter value is evenly divisible by two.

* * * * *